US 6,556,145 B1

(12) United States Patent
Kirkpatrick et al.

(10) Patent No.: US 6,556,145 B1
(45) Date of Patent: Apr. 29, 2003

(54) TWO-WIRE FLUID TEMPERATURE TRANSMITTER WITH THERMOCOUPLE DIAGNOSTICS

(75) Inventors: William R. Kirkpatrick, Faribault, MN (US); Charles E. Goetzinger, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/406,263

(22) Filed: Sep. 24, 1999

(51) Int. Cl.[7] .............................................. G08C 71/00
(52) U.S. Cl. .................. 340/870.17; 324/525; 324/537; 702/99; 702/133; 374/183; 340/501
(58) Field of Search .................... 340/870.17, 501; 324/537, 525; 702/99, 133, 53, 58; 700/79; 374/183, 185; 73/204.19

(56) References Cited

U.S. PATENT DOCUMENTS

| | | | |
|---|---|---|---|
| 3,096,434 A | 7/1963 | King ......................... 235/151 |
| 3,404,264 A | 10/1968 | Kugler ....................... 235/194 |
| 3,468,164 A | 9/1969 | Sutherland ................... 73/343 |
| 3,590,370 A | 6/1971 | Fleischer .................... 324/51 |
| 3,688,190 A | 8/1972 | Blum ....................... 324/61 R |
| 3,691,842 A | 9/1972 | Akeley ..................... 73/398 C |
| 3,701,280 A | 10/1972 | Stroman ....................... 73/194 |
| 3,855,858 A | 12/1974 | Cushing .................. 73/194 EM |
| 3,973,184 A | 8/1976 | Raber ......................... 324/51 |
| RE29,383 E | 9/1977 | Gallatin et al. ............... 137/14 |
| 4,058,975 A | 11/1977 | Gilbert et al. ............. 60/39.28 |
| 4,099,413 A | 7/1978 | Ohte et al. .................... 73/359 |
| 4,102,199 A | 7/1978 | Talpouras .................... 73/362 |
| 4,122,719 A | 10/1978 | Carlson et al. ............... 73/342 |
| 4,249,164 A | 2/1981 | Tivy ........................ 340/870.3 |

(List continued on next page.)

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |

(List continued on next page.)

OTHER PUBLICATIONS

"On–Line Tool Condition Monitoring system with Wavelet Fuzzy Neural Network", by Li Xiaoli et al., pp. 271–276 (1997).

U.S. patent application Ser. No. 09/852,102, Eryurek et al., filed May 9, 2001.

"Thermocouple Continuity Checker," IBM Technical Disclosure Bulletin, vol. 20, No. 5, p. 1954 (Oct. 1977).

"A Self–Validating Thermocouple," Janice C–Y et al., IEEE Transactions on Control Systems Technology, vol. 5, No. 2, pp. 239–253 (Mar. 1997).

Copy of International Search Report from Application No. PCT/US01/40791 with international filing date of May 22, 2001.

(List continued on next page.)

Primary Examiner—Michael Horabik
Assistant Examiner—Albert K. Wong
(74) Attorney, Agent, or Firm—Westman, Champlin & Kelly, P.A.

(57) ABSTRACT

A two-wire temperature transmitter performs thermocouple diagnostics on a thermocouple attached to the transmitter to determine if, and the extent to which, the thermocouple has degraded. Various methods of obtaining thermocouple resistance are also provided.

14 Claims, 7 Drawing Sheets

U.S. PATENT DOCUMENTS

| | | | |
|---|---|---|---|
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,571,689 A | 2/1986 | Hildebrand et al. | 364/481 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,707,796 A | 11/1987 | Calabro et al. | 364/552 |
| 4,736,367 A | 4/1988 | Wroblewski et al. | 370/85 |
| 4,777,585 A | 10/1988 | Kokawa et al. | 364/164 |
| 4,807,151 A | 2/1989 | Citron | 364/510 |
| 4,818,994 A * | 4/1989 | Orth et al. | 340/501 |
| 4,831,564 A | 5/1989 | Suga | 364/551.01 |
| 4,841,286 A | 6/1989 | Kummer | 340/653 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Borden et al. | 73/718 |
| 5,510,779 A | 4/1996 | Maltby et al. | 340/870.3 |
| 5,511,004 A | 4/1996 | Dubost et al. | 364/551.01 |
| 5,548,528 A | 8/1996 | Keeler et al. | 364/497 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,598,521 A | 1/1997 | Kilgore et al. | 395/326 |
| 5,600,148 A | 2/1997 | Cole et al. | 250/495.1 |
| 5,623,605 A | 4/1997 | Keshav et al. | 395/200.17 |
| 5,637,802 A | 6/1997 | Frick et al. | 73/724 |
| 5,640,491 A | 6/1997 | Bhat et al. | 395/22 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,700,090 A | 12/1997 | Eryurek | 374/210 |
| 5,703,575 A * | 12/1997 | Kirkpatrick | 340/584 |
| 5,704,011 A | 12/1997 | Hansen et al. | 395/22 |
| 5,705,978 A | 1/1998 | Frick et al. | 340/511 |
| 5,708,585 A | 1/1998 | Kushion | 364/431.061 |
| 5,713,668 A | 2/1998 | Lunghofer et al. | 374/179 |
| 5,719,378 A | 2/1998 | Jackson, Jr. et al. | 219/497 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,752,008 A | 5/1998 | Bowling | 395/500 |
| 5,764,891 A | 6/1998 | Warrior | 395/200.2 |
| 5,781,878 A | 7/1998 | Mizoguchi et al. | 701/109 |
| 5,801,689 A | 9/1998 | Huntsman | 345/329 |
| 5,805,442 A | 9/1998 | Crater et al. | 364/138 |
| 5,828,567 A | 10/1998 | Eryurek et al. | 700/79 |
| 5,829,876 A | 11/1998 | Schwartz et al. | 374/1 |
| 5,848,383 A | 12/1998 | Yuuns | 702/102 |
| 5,859,964 A | 1/1999 | Wang et al. | 395/185.01 |
| 5,876,122 A | 3/1999 | Eryurek | 374/183 |
| 5,887,978 A | 3/1999 | Lunghofer et al. | 374/179 |

| | | | | |
|---|---|---|---|---|
| 5,923,557 A | 7/1999 | Eidson ............... 364/471.03 |
| 5,924,086 A | 7/1999 | Mathur et al. ............. 706/25 |
| 5,926,778 A | 7/1999 | Pöppel .................. 702/130 |
| 5,940,290 A | 8/1999 | Dixon .................... 364/138 |
| 5,956,663 A | 9/1999 | Eryurek et al. ........... 702/183 |
| 5,970,430 A | 10/1999 | Burns et al. .............. 702/122 |
| 6,014,902 A | 1/2000 | Lewis et al. ............. 73/861.12 |
| 6,016,523 A * | 1/2000 | Zimmerman et al. ....... 710/303 |
| 6,016,706 A | 1/2000 | Yamamoto et al. ............. 9/6 |
| 6,017,143 A | 1/2000 | Eryurek et al. ............. 700/51 |
| 6,045,260 A | 4/2000 | Schwartz et al. ........... 374/183 |
| 6,047,220 A | 4/2000 | Eryurek et al. ............. 700/28 |
| 6,047,222 A | 4/2000 | Burns et al. ............... 700/79 |
| 6,052,655 A * | 4/2000 | Kobayashi et al. ........ 702/104 |
| 6,119,047 A | 9/2000 | Eryurek et al. ............. 700/28 |
| 6,151,560 A | 11/2000 | Jones ..................... 702/58 |
| 6,192,281 B1 | 2/2001 | Brown et al. ................ 700/2 |
| 6,195,591 B1 | 2/2001 | Nixon et al. ............... 700/83 |
| 6,199,018 B1 | 3/2001 | Quist et al. ................ 702/34 |
| 6,263,487 B1 | 7/2001 | Stripf et al. ................ 717/1 |
| 6,298,377 B1 | 10/2001 | Hartikainen et al. ........ 709/223 |
| 6,356,191 B1 * | 3/2002 | Kirkpatrick et al. ........ 340/501 |

FOREIGN PATENT DOCUMENTS

| | | |
|---|---|---|
| EP | 0 122 622 A1 | 10/1984 |
| EP | 0 413 814 A1 | 2/1991 |
| EP | 0 487 419 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1 058 093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-01914 | 1/1989 |
| JP | 64-72699 | 3/1989 |
| JP | 2-05105 | 1/1990 |
| JP | 03229124 | 10/1991 |
| JP | 5-122768 | 5/1993 |
| JP | 06242192 | 9/1994 |
| JP | 7-063586 | 3/1995 |
| JP | 07234988 | 9/1995 |
| JP | 8-054923 | 2/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/20469 | 5/1998 |
| WO | WO 00/70531 | 11/2000 |

OTHER PUBLICATIONS

Copy of International Search Report from Application No. PCT/US01/40782 with international filing date of May 22, 2001.

U.S. patent application Ser. No. 09/169,873, Eryurek et al., filed Oct. 12, 1998.

U.S. patent application Ser. No. 09/175,832, Eryurek et al., filed Oct. 19, 1998.

U.S. patent application Ser. No. 09/257,896, Eryurek et al., filed Feb. 25, 1999.

U.S. patent application Ser. No. 09/303,869, Eryurek et al., filed May 03, 1999.

U.S. patent application Ser. No. 09/335,212, Kirkpatrick et al., filed Jun. 17, 1999.

U.S. patent application Ser. No. 09/344,631, Eryurek et al., filed Jun. 25, 1999.

U.S. patent application Ser. No. 09/360,473, Eryurek et al., filed Jul. 23, 1999.

U.S. patent application Ser. No. 09/369,530, Eryurek et al., filed Aug. 06, 1999.

U.S. patent application Ser. No. 09/383,828, Eryurek et al., filed Aug. 27, 1999.

U.S. patent application Ser. No. 09/384,876, Eryurek et al., filed Aug. 27, 1999.

U.S. patent application Ser. No. 09/409,098, Eryurek et al., filed Sep. 30,1999.

U.S. patent application Ser. No. 09/409,114, Eryurek et al., filed Sep. 30,1999.

U.S. patent application Ser. No. 09/565,604, Eryurek et al., filed May 04, 2000.

U.S. patent application Ser. No. 09/576,450, Wehrs, filed May 23, 2000.

U.S. patent application Ser. No. 09/606,259, Eryurek, filed Jun. 29, 2000.

U.S. patent application Ser. No. 09/616,118, Eryurek et al., filed Jul. 14, 2000.

U.S. patent application Ser. No. 09/627,543, Eryurek et al., filed Jul. 28, 2000.

U.S. patent application Ser. No. 09/576,719, Coursolle et al., filed May 23, 2000.

U.S. patent application Ser. No. 09/799,824, Rome et al., filed Mar. 05, 2001.

U.S. patent application Ser. No. 09/855,179, Eryurek et al., filed May 14, 2001.

U.S. patent application Ser. No. 09/852,102, Eryurek et al., May 09, 2001.

"A TCP/IP Tutorial" by, Socolofsky et al., Spider Systems Limited, Jan. 1991 pp. 1–23.

"Approval Standards For Explosionproof Electrical Equipment General Requirements", Factory Mutual Research Cl. No. 3615, Mar. 1989, pp. 1–34.

"Approval Standard Intrinsically Safe Apparatus and Associated Apparatus For Use In Class I, II, III, Division 1 Hazardous (Classified) Locations", Factory Mutual Research, Cl. No. 3610, Oct. 1988, pp. 1–70.

"Automation On–line"by, Phillips et al., Plant Services, Jul. 1997, pp. 41–45.

"Climb to New Height by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, pp. 23–29.

"Ethernet Rules Closed–loop System"by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard for Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., pp. 121–128.

"Fieldbus Technical Overview Understanding FOUNDATION™fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facitilites Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web", by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Productded by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *COMMON. STATIS.–SIMULA.*, 1995, pp. 409–437.

"A Knowledge–Based Approach for Detection and Diagnosis of Out–of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology,* pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice,* vol. 4, No. 10, pp. 1339–1354, (1996).

"Sensor Validation for Power Plants Using Adaptive Back-propagation Neural Network,"*IEEE Transactions on Nuclear Science,* vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University.*

"Smart Temperature Measurement in the '90s", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M. P. Henry et al., *Report No. QUEL 1884/91,* (1991).

"Taking Full Advantage of Smart Transmitter Technology Now," by G. Orrison, *Control Engineering*, vol 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation", by B. R. Upadhyaya et al., *Department of Nuclear Engineering*, pp. 1–18.

"Application of Neural Networks for Sensor Validating and Plant Monitoring", by b. h. Upadhyaya et al., *Nuclear Technology*, vol 97, No. 2, Feb. 1992 pp. 170–176.

"automated Generation of Nonlinear System Characterization for Sensor Failure Detection," by B.R. Upadhyaya et al., *ISA*, 1989 pp. 269–274.

"In Situ Calibration of Nuclear Plant Platinum Resistance Thermometers Using Johnson Noise Methods", *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a resistance Therometer For Use Up to 1600°C", M.J. de Groot et al., *CAL LAB*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposiom on Temperature*, 1992.

"Johnson Noise Power Thermometer and its Application in Process Temperature Measurement,", by T.V. Blalock et al., *American Institute of Physics*1982, pp. 1249–1259.

"Field-based Architecture is Based on Open Systems, Improves Plant Performance", by P. Cleaveland, *I&CS*, Aug. 1996, pp. 73–74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposiom on Space Nuclear Power Systems*, Jan. 1990.

"Smart Field Devices Provide New Process Data, Increase System Flexibility", by Mark Boland, *I&CS*, Nov. 1994, pp. 45–51.

"Wavelet Analysis of Vibration, Part I: Theory[1], " by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol 116, Oct. 1994, pp. 417–425.

"Development of a Long-Life, High-Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics,* 1982 pp. 1219–1223.

"Sensor and Device Diagnostics for Predictive and Proactive Maintenance", by B. Boynton, *A Paper Presented at the Electric Power Research Institute –Fossil Plant Maintenance Conference* in Baltimore, Maryland, Jul. 29–Aug. 1, 1996, pp. 50-1 –50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et la., *Proceedings of the 29th Conference on Decision and Control*, 1990, pp. 3277–3282.

"A Fault–Tolerant Interface for Self–Validating Sensors", by M. P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning,* (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7, pp. 907–924, (1995).

"The Implications of Digital Communications on Sensor Validation", by M. Henry et al., *Report No. QUEL 1912/92*, (1992).

"In Situ Response Time Testing of Thermocouples", *ISA*, by H.M. Hashemian et al., Paper No. 89–0056, pp. 587–593, (1989).

"An Integrated Architecture For Signal Validation in Power Plants,", by B.R. Upadhyaya et al., *Third IEEE International Symposium on Intelligent Control*, Aug. 24–26, 1988, pp. 1–6.

"Integration of Multiple Signal Validation Modules for Sensor Monitoring, "by B. Upadhyaya et al., *Department of Nuclar Engineering*, Jul 8, 1990, pp. 1–6.

"Intelligent Behaviour for Self–Validating Sensors", by M. P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol 25, No. 3, Mar. 1982, New York, USA, pp. 244–246.

"Neural Networks for Sensor Validation and Plant Monitoring," by B. Upadhyaya, *International Fast Reactor Safelty Meeting*, Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151–162.

*Instrument Engineers'Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free,"3 Pages, PR Newswire (Nov. 4, 1998).

Warrior, J., "The IEEE P1451.1 Object Model Network Independent Interfaces for Sensors and Actuators,"pp. 1–14, Rosemount Inc. (1997).

Warrior, J., "The Collision Between the Web and Plant Floor Automation,"$6^{th}$ . WWW Conference Workshop on Embedded Web Technology, Santa Clara, CA Apr. 7, 1997).

Microsoft Press Computer Dictionary, $3^{rd}$ Edition, page 124.

"Internal Statistical Quality Control for Quality Monitoring Instruments", by P. Girling et al., *ISA*, 15 pages., 1999.

Web Pages form www.triant.com (3 pages).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study, " *ASAIO Journal*, by Alex A. Yu et al., vol. 44, No. 5, pp. M475–M479, (Sep. –Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements,"*Advances in bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution,"*Hydroaccoustic Facilities, Instrumentation, and Experimental Techniques*, NCA–vol. 10, pp. 31–36. (1991).

"Developing Predictive Models for Cavitation Erosion," *Codes and Standards in a Global Environment*, PVP–vol. 259, pp. 189–192 (1993).

"Self–Diagnosing Intelligent Motors: A Key Enabler for Next Generation Manufactoring System," by Fred M. Discenzo et al., pp. 3/1–3/4 (1999).

"A Microcomputer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP", by Barretto et al., Computer Networking, pp. 295–304 (1990).

"Computer Simulation of H1 Field Bus Transmission, " by Utsumi, et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (Oct. 1992).

"Ziele und Anwendungen von Feldbussystemen," by T. Pfeifer et al., pp. 549–557 (Oct. 1987).

"PROFIBUS–Infrastrukturmassnahmen," by Tilo Pfeifer et al., pp. 416–419 (Aug. 1991).

"Simulation des Zeitverhaltens von Feldbussystemen,"by O. Schnelle, pp. 440–442 (1991).

"Modélisation et simulation d'un bus de terrain: FIP," by Song et al., pp. 5–9 (undated).

"Field Bus Networks for Automation Systems containing Intelligent Functional Unites," by W. Kriesel et al., pp. 486–489 (1987).

"Field Buses for Process Interconnection with Digital Control Systems,"Technologiá, pp. 141–147 (1990).

"Decentralised Systems with Real–Time Field bus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press. p. 156.

"On–Line Tool Condition Monitoring System With Wavelet Fuzzy Neural Network,"by Li Xiaoli et al., pp. 271–276 (1997).

"Optimal Design of the Coils of An Electromagnetic Flow Meter," by Michalski, A. et al., IEEE Tansactions on Magnetics, vol. 34, Issue 5, Part 1, pp. 2563–2566 (1998).

"Magnetic Fluid Flow Meter for Gases,"Popa, N.C., IEEE Transactions on Magnetics. vol 30, Issue 2, Part 1–2, pp. 936–938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093–1097 (1998).

"Additional Information From Flowmeters Via Signal Analysis," by Amadi–Echendu, J. E. et al., IEEE Instrumentation and Measurement Technology Conference Record, vol. 7, pp. 187–193 (1990).

"Notification of Transmittal of the International Search Report or the Declaration" for PCT/US02/14934.

* cited by examiner

TWO-WIRE FLUID TEMPERATURE TRANSMITTER WITH THERMOCOUPLE DIAGNOSTICS

BACKGROUND OF THE INVENTION

The process industry employs process variable transmitters to monitor process variables associated with substances such as solids, slurries, liquids, vapors, and gasses in chemical, pulp, petroleum, pharmaceutical, food and other processing plants. Process variables include pressure, temperature, flow, level, turbidity, density, concentration, chemical composition and other properties. A process fluid temperature transmitter provides an output related to a sensed process substance temperature. The temperature transmitter output can be communicated over a process control loop to a control room, or the output can be communicated to another process device such that the process can be monitored and controlled. In order to monitor a process fluid temperature, the transmitter includes a temperature sensor, such as a thermocouple.

A thermocouple is fabricated by joining two dissimilar metals, such as bismuth and antimony. The junction of the two dissimilar metals produces a small voltage that is related to its temperature. This is known as the Seebeck effect. Process fluid temperature transmitters that employ thermocouple sensors, thus measure the small voltage of the thermocouple, and then calculate process fluid temperature based upon the thermocouple voltage. Although a thermocouple's primary variable of interest is its voltage (indicative of temperature) it is generally known that the thermocouple's resistance is indicative of its condition. As thermocouples age, or otherwise degrade, thermocouple resistance changes. Thus, thermocouple resistance measurement can be used to evaluate the condition of the thermocouple. In order to measure the resistance, a test current is generally passed through the thermocouple, and the resulting voltage is measured and used to calculate the resistance.

In two-wire process control installations, process measurement devices, such as temperature transmitters can receive all required electrical power through the same two wires that are used for data communication. Generally, the amount of power available on the loop is limited in order to facilitate compliance with intrinsic safety requirements. Typically, the loop current varies between 4 and 20 mA to indicate a process variable. Thus, a device powered by the loop must be operable on 4 mA or less. Such minimal electrical power generally limits the computational capacity of a given process device, as well as the amount of power that can be used for diagnostics. Thus, there is a tradeoff between the convenience of two-wire temperature transmitters, and the ability to provide suitable amounts of diagnostic current through a thermocouple to achieve accurate diagnostic information.

As process control becomes more accurate, there is an increasing need to provide process devices that not only provide process variables, but also indicate their own health. By providing enhanced process device diagnostics, process variable information can be relied upon to a greater or lesser extent, depending upon the state of the process device. Providing such devices will enhance process control and potentially increase the efficiency of predictive maintenance.

SUMMARY

A two-wire temperature transmitter performs thermocouple diagnostics on a thermocouple attached to the transmitter to determine if, and the extent to which, the thermocouple has degraded. The transmitter passes a diagnostic current through a thermocouple to obtain the resistance of the thermocouple. The resistance is then used to calculate a diagnostic output that is related to thermocouple degradation. Various methods of obtaining thermocouple resistance are also provided.

DETAILED DESCRIPTION

Although the present invention will be described with reference to embodiments of two-wire process fluid temperature transmitters, and the manner in which thermocouple degradation is assessed, workers skilled in the art will recognize that changes may be made in form and detail without departing from the spirit and scope of the invention, which are defined by the appended claims.

Figure 1:
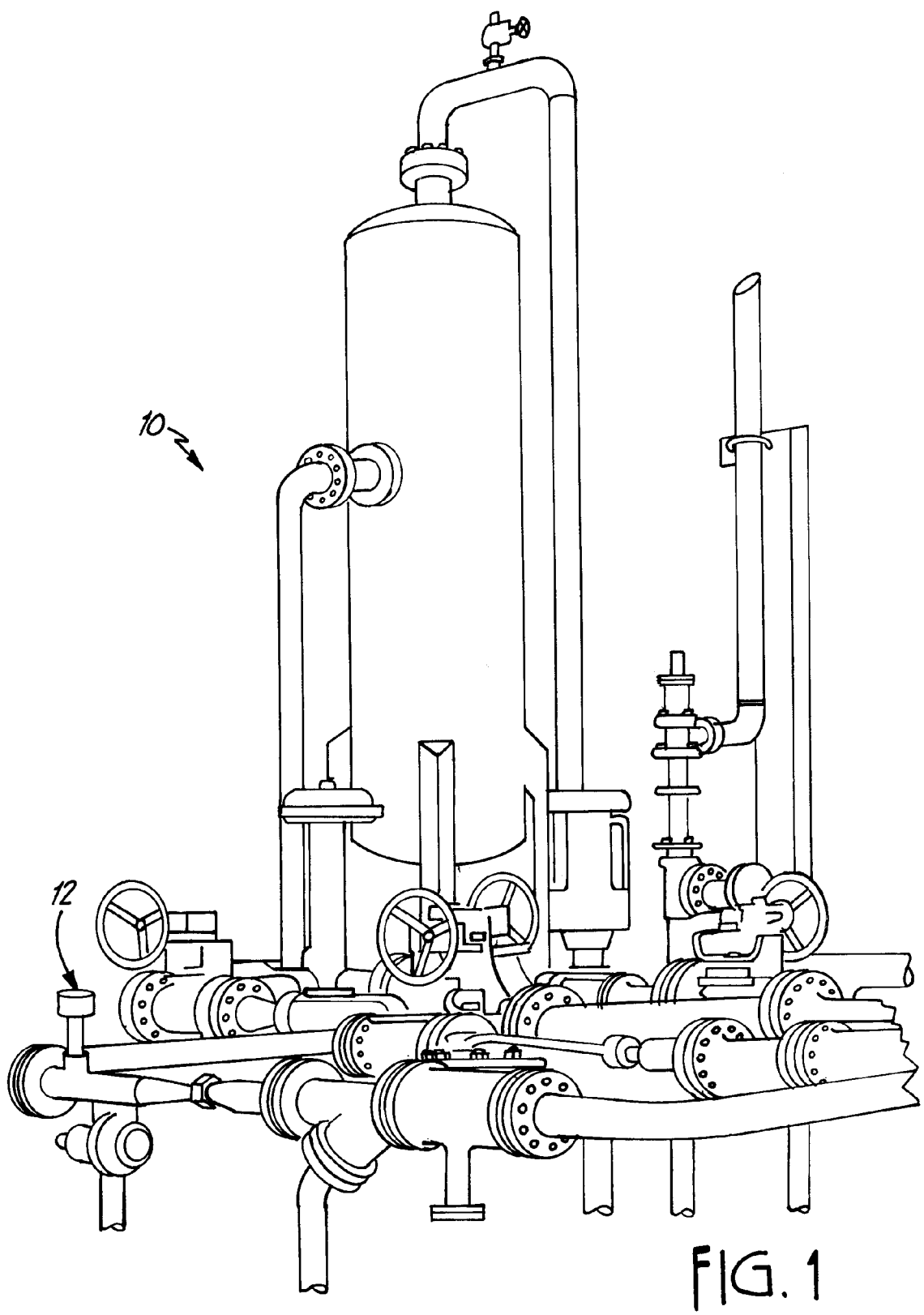
FIG. 1 is a diagram of the environment of a process fluid temperature transmitter.
Figure 2:
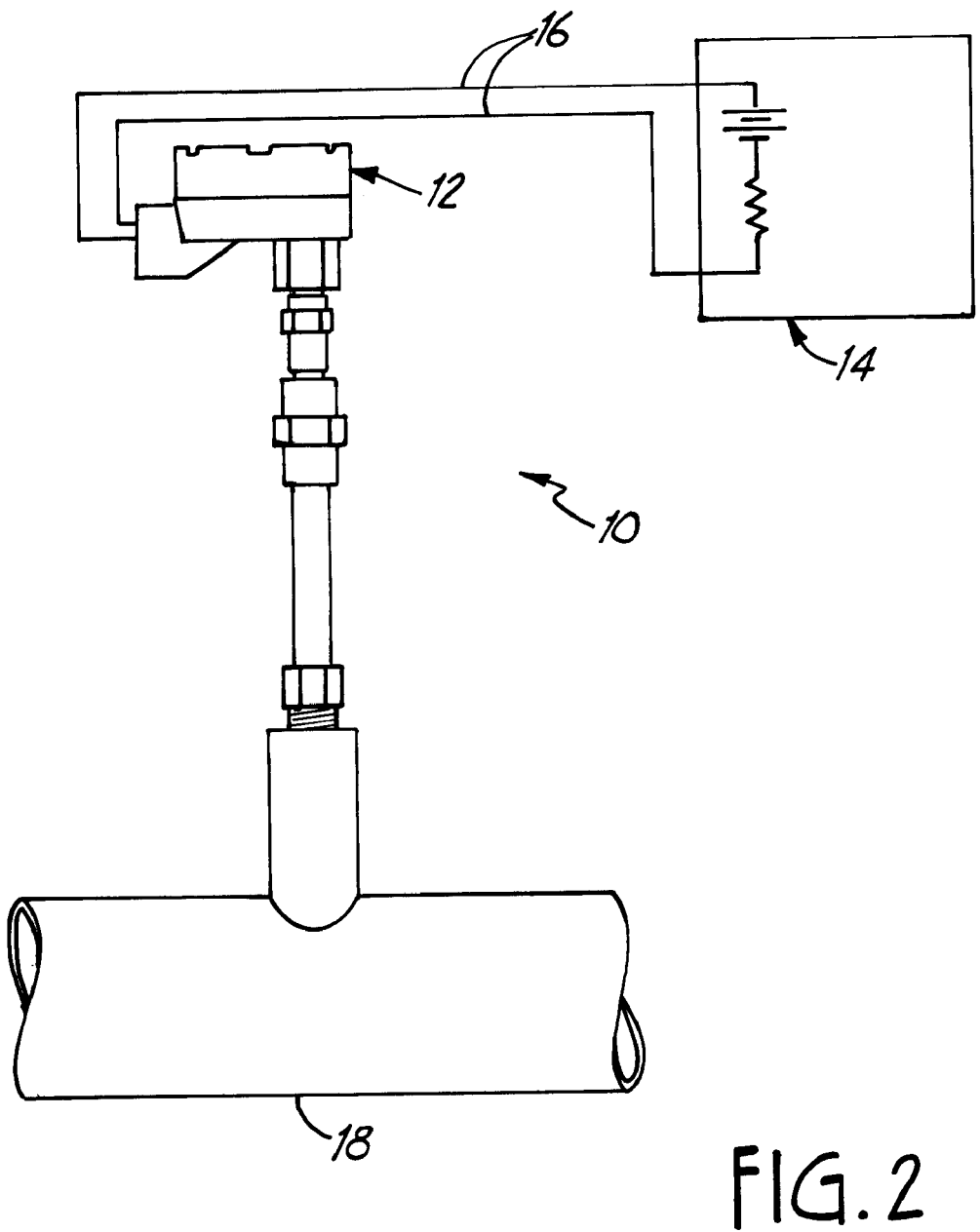
FIG. 2 is a diagrammatic view of process fluid temperature transmitter 12.

FIGS. 1 and 2 illustrate an environment of a two-wire process fluid temperature transmitter in accordance with embodiments of the invention. FIG. 1 shows process fluid control system 10 including process fluid temperature transmitter 12. FIG. 2 illustrates process control system 10 including process fluid temperature transmitter 12 electrically coupled to control room 14 (modeled as a voltage source and resistance) over a two-wire process control loop 16. Transmitter 12 is mounted on and coupled to a process fluid container such as pipe 18. Transmitter 12 monitors the temperature of process fluid in process pipe 18 and transmits temperature information to control room 14 over loop 16. Transmitter 12 is couplable to loop 16 through terminals 17 (shown in FIG. 3).

Figure 3:
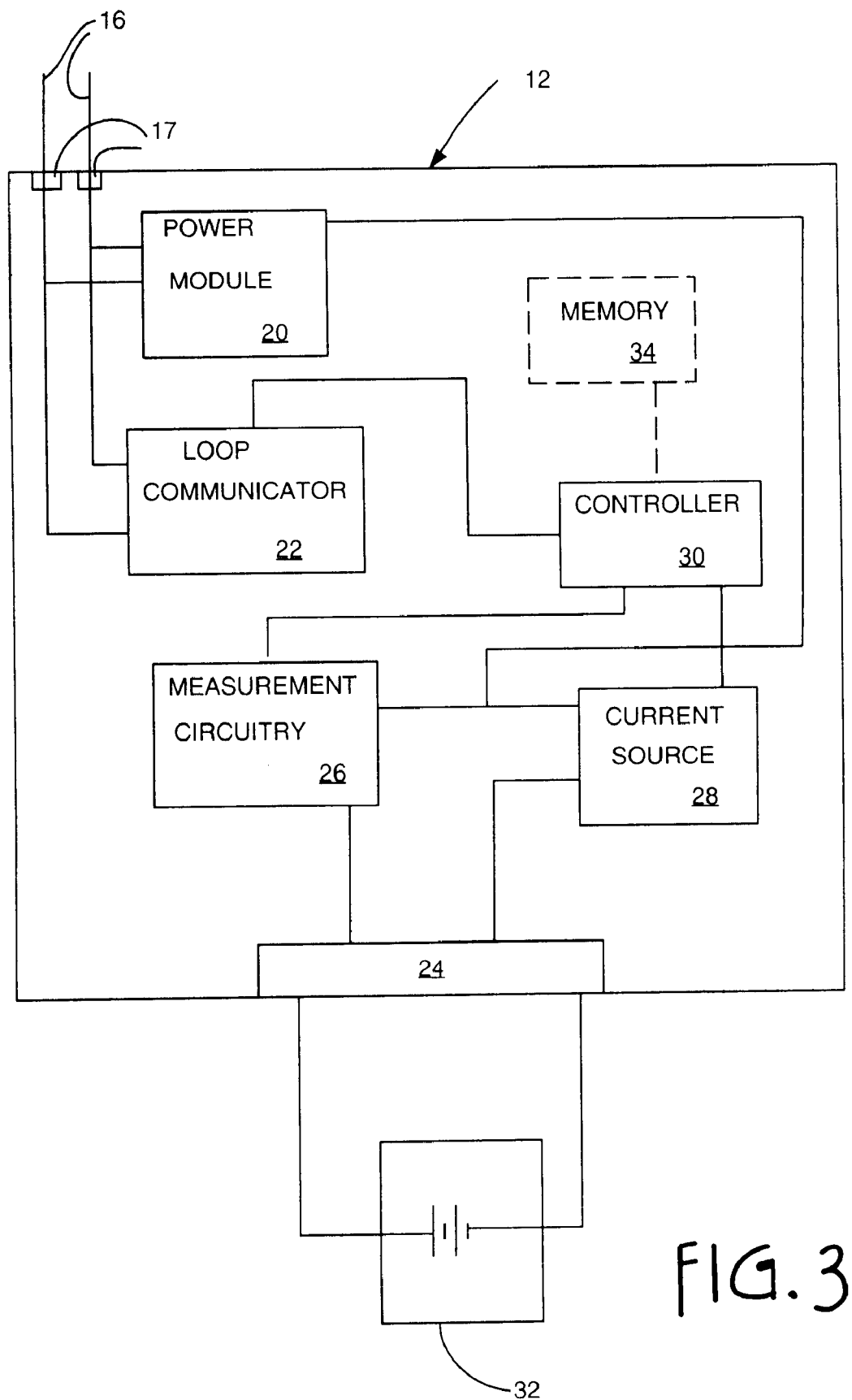
FIG. 3 is a system block diagram of a process fluid temperature transmitter.

FIG. 3 is a system block diagram of process fluid transmitter 12 in accordance with an embodiment of the invention. Transmitter 12 includes power module 20, loop communicator 22, thermocouple input 24, measurement circuitry 26, current source 28, and controller 30. Transmitter 12 is couplable to thermocouple 32 (modeled as a voltage source) such that transmitter 12 can obtain a voltage measurement from thermocouple 32, and relate the measurement to a calculated process fluid temperature. Transmitter 12 then provides the calculated process fluid temperature on two-wire process control loop 16.

Power module 20 is disposed within transmitter 12, and is couplable to two-wire process control loop 16. Module 20 suitably conditions power received from loop 16 for the various components of transmitter 12. Utilizing power module 20, transmitter 12 is able to operate solely upon power received from process control loop 16. Module 20 can comprise, for example, known electronics such as a DC-DC power regulation device. On loop 16, which in some embodiments employs analog signaling between 4 and 20 mA, module 20 operates to condition four or less milliamps for provision to other components within transmitter 12. Additionally, module 20 can be adapted to prevent electrical noise received from loop 16 to reach the other components.

Loop communicator 22 is couplable to two-wire process control loop 16, and is configured to communicate over loop 16. Communicator 22 can be of the type generally known in the art. For example, communicator 22 can be suitably selected to provide analog communication, digital communication, or a combination of the two. One such combination of analog and digital communication is known as the Highway Addressable Remote Transducer (HART®) protocol. One version of the HART® protocol superimposes a digital signal upon a 4–20 mA analog signal. With such a protocol, the primary variable of interest can be provided in one mode, such as the analog mode, while a diagnostic signal is provided in the other mode. However, the present invention can be practiced with purely analog communications, as well as purely digital communications (such as provided by FOUNDATION™ Fieldbus).

Transmitter 12 also includes thermocouple input 24. Input 24 provides a removable electrical coupling to thermocouple 32. Additionally, input 24 can, if desired, be configured to accommodate a second thermocouple to allow transmitter 12 to provide cold junction compensation. Further, the actual temperature of input 24 can be sensed, in any known manner, to provide cold junction compensation through known mathematical algorithms. Thermocouple 32 can be any appropriate thermocouple, such as Type J or Type K, or the like. As will be described in more detail later in the specification, the resistance of thermocouple 32 is sensed to provide an indication of thermocouple viability. However, since the thermocouple's primary variable of interest is its voltage, and since virtually no current flows through the thermocouple circuit during voltage sensing, thermocouples typically utilize only two wires. However, to provide more accurate resistance measurements, it is contemplated that four-wire thermocouples could be used, in which case input 24 is suitably adapted to receive the four wires and create a Kelvin connection.

Measurement circuitry 26 is disposed within transmitter 12, and is adapted to measure a voltage across thermocouple 32. Circuitry 26 can be any circuitry capable of providing a suitable electrical indication of thermocouple voltage. In one embodiment, circuitry 26 comprises a known analog to digital converter. Circuitry 26 is coupled to input 24, power module 20 and controller 30. Circuitry 26 provides an output to controller 30, typically in digital form, that is indicative of a voltage sensed across thermocouple 32.

Current source 28 is coupled to input 24, power module 20, and controller 30. Current source 28 can be any suitable circuitry capable of passing a known diagnostic current through a thermocouple connected to input 24. Diagnostic currents as low as one microamp can be used. For example, source 28 can be a precision semiconductor current device, or the like. Source 28 can be adapted to pass direct current (DC) or alternating current (AC) through thermocouple 32. Additionally, source 28 can be circuitry that provides an unknown current through a known resistance, such that the current can be measured, optionally with measurement circuitry 26. During a diagnostic mode, source 28 passes a diagnostic current through thermocouple 32. The diagnostic current can be passed in either direction through thermocouple 32, and can also be alternately passed through thermocouple 32 in opposite directions. While the diagnostic current passes through thermocouple 32, measurement circuitry 26 provides a signal to controller 30 that is related to the voltage across thermocouple 32, and thus is related to the resistance of thermocouple 32. As will be described later, the voltage measured during the diagnostic mode can be compensated to reduce or eliminate the voltage component due to the Seebeck effect, thus providing a diagnostic signal that is indicative substantially solely of thermocouple resistance.

Controller 30 is disposed within transmitter 12, and is coupled to power module 20, loop communicator 22, measurement circuitry 26, and current source 28. Controller 30 can be any suitable circuitry capable of relating voltage information received from measurement circuitry 26 to process fluid temperature, and capable of providing thermocouple diagnostics. Specifically, controller 30 can be a microprocessor or the like. During normal operation, current source 28 does not pass any current through thermocouple 32, and thus the signal received from measurement circuitry 26 is indicative solely of thermocouple voltage. Controller 30 relates the information received from measurement circuitry 26 to process fluid temperature through suitable equations or a look-up table. Controller 30 then passes process variable output information to loop communicator 22, such that the process variable is communicated over two-wire process control loop 16.

During the diagnostic mode, controller 30 commands current source 28 to pass the diagnostic current through thermocouple 32. In some embodiments, the diagnostic current can be alternately passed in opposite directions, and voltage information received from measurement circuitry 26 (indicative of voltage across the thermocouple in each direction) can be used to calculate thermocouple resistance independent of the Seebeck voltage. In other embodiments, the Seebeck voltage can simply be subtracted from the voltage measured while the diagnostic current passed through the thermocouple. Various other techniques for eliminating the Seebeck voltage from diagnostic measurements are set forth below.

Controller 30 is adapted to relate thermocouple resistance to a diagnostic output. Such relation is typically in the form of a comparison of present thermocouple resistance to initial thermocouple resistance (measured during the commissioning of transmitter 12). However, the relation can also be in the form of a comparison with a pre-selected threshold resistance, or comparison with a running long-term average. Additionally, the long-term average can be used by controller 30 for trend analysis to provide lifetime estimation. In embodiments where various diagnostic measurements are stored, controller 30 can utilize optional memory 34 for such storage.

The diagnostic output is provided to loop communicator 22 for communication across loop 16. The diagnostic output can take many forms. The output can simply be an alarm indicating thermocouple failure, or impending failure. However, the output can also be in the form of a lifetime estimation indicating an estimated time at which the thermocouple output will no longer suitably indicate process fluid temperature.

In addition to providing the diagnostic output, controller 30 can be adapted to utilize knowledge of the degradation condition of thermocouple 32 while providing the process variable output. Such adaptation can be in the form of hardware, software or a combination of both. In this manner, as thermocouple 32 degrades, and the relationship between thermocouple voltage and process fluid temperature changes, controller 30 can compensate, to some extent, for the degradation when providing the process variable output. The relationship between degradation, process fluid temperature, and voltage can be determined experimentally and provided to controller 30 in the form of compensation equations, or look-up tables. For example, if the input impedance of the measurement circuitry is known, and thermocouple resistance is measured as discussed above, then measurement error caused by voltage divider action between the input impedance and the thermocouple resistance can be calculated and used to compensate the actual Seebeck voltage.

Figure 4:
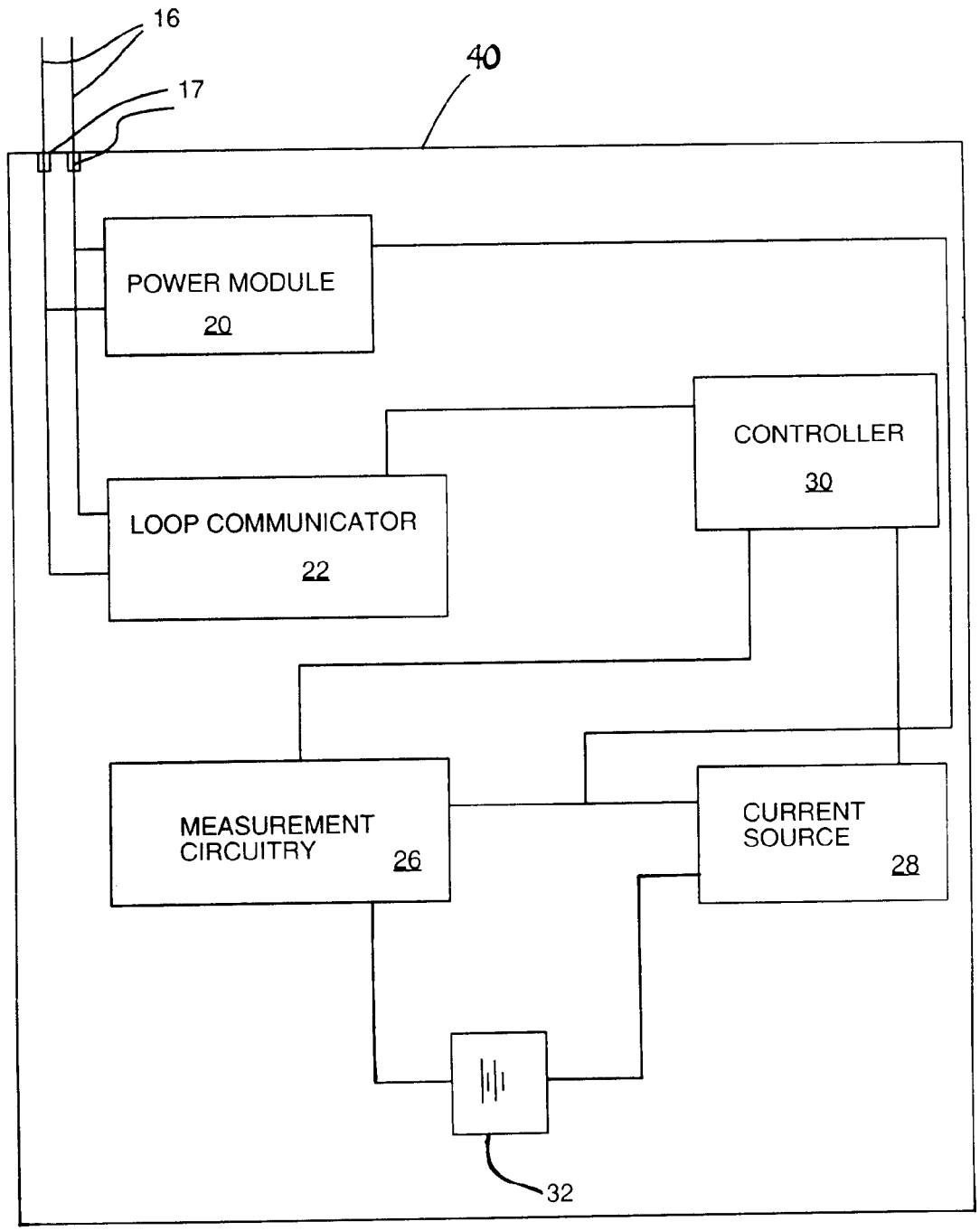
FIG. 4 is a system block diagram of a process fluid temperature transmitter.

FIG. 4 is a system block diagram of transmitter 40 in accordance with another embodiment of the invention. Transmitter 40 bears many similarities to transmitter 12, and like components are numbered similarly. Transmitter 40 differs from transmitter 12 in that transmitter 40 includes thermocouple 32. Since thermocouple 32 is disposed within transmitter 40, an input, such as input 24, is not included. Instead, thermocouple 32 is coupled directly to measurement circuitry 26 and current source 28. Although single lines are used to denote such coupling, such lines are provided for clarity and can, in fact, comprise multiple conductors.

Figure 5:
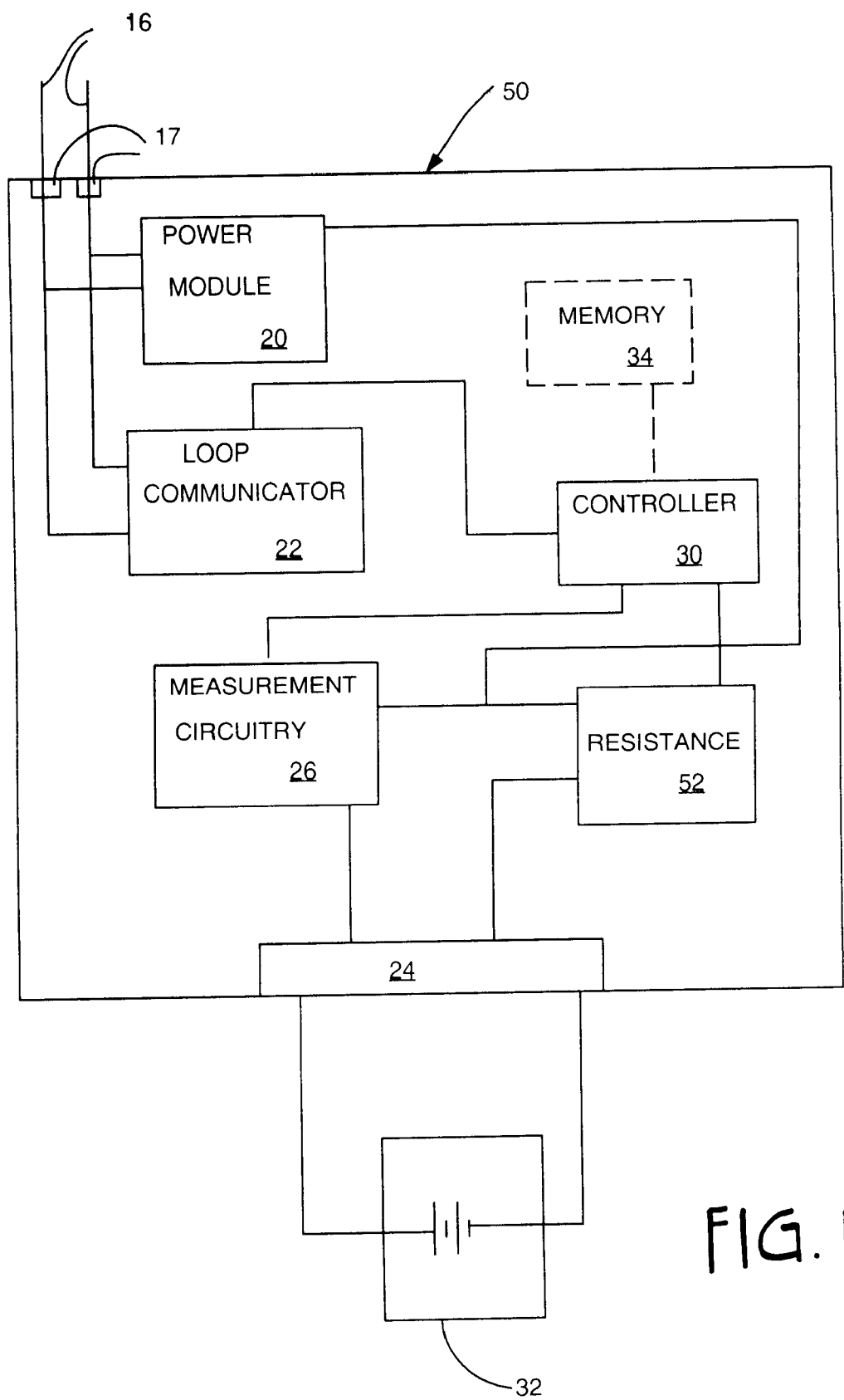
FIG. 5 is a system block diagram of a process fluid temperature transmitter.
Figure 6:
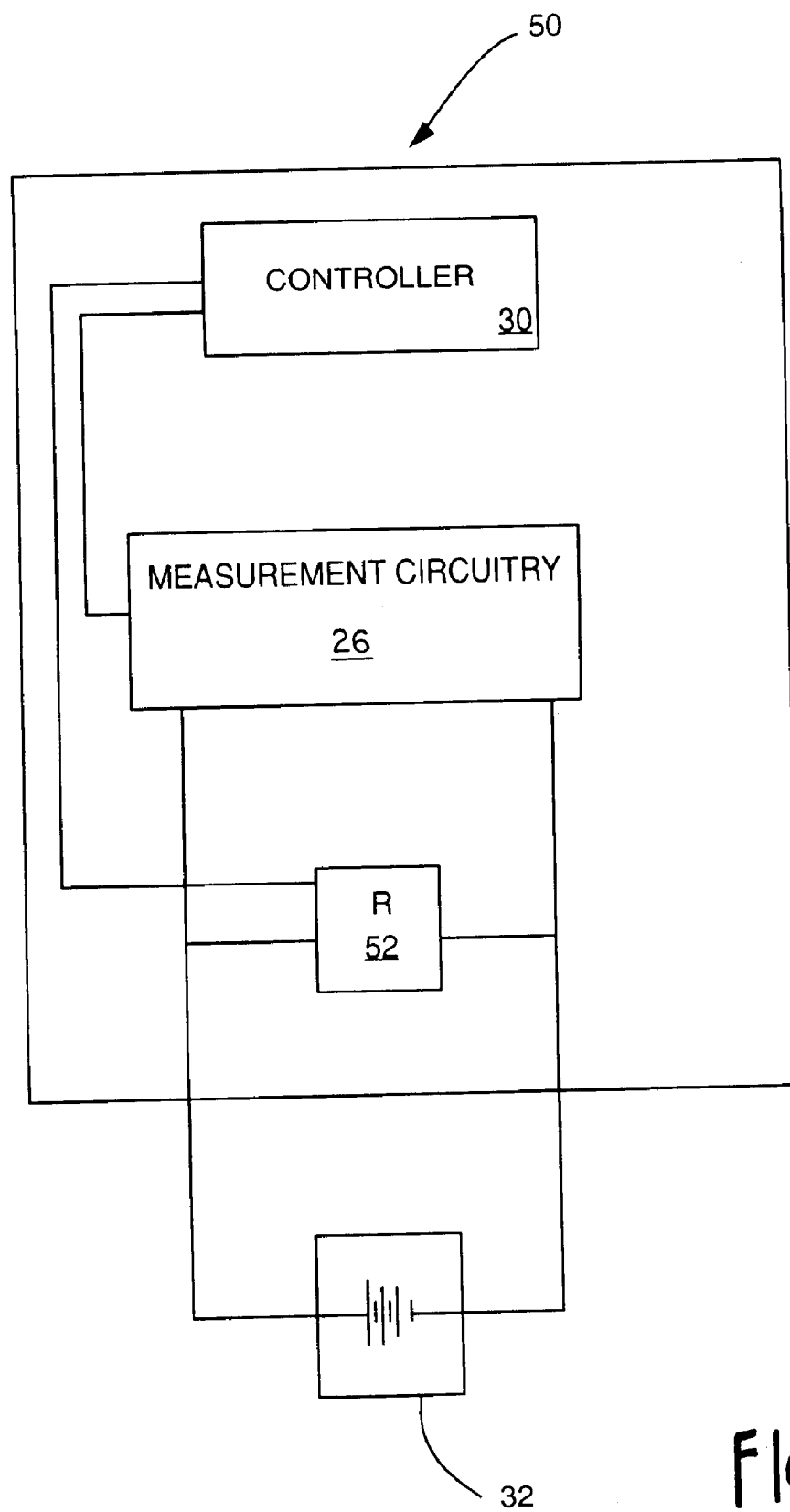
FIG. 6 is a schematic representation of a portion of the transmitter shown in FIG. 5.

FIG. 5 is a system block diagram of transmitter 50 in accordance with another embodiment of the invention. Transmitter 50 is similar to transmitter 12 and like components are numbered similarly. The main difference between transmitter 12 and transmitter 50 is that transmitter 50 does not include a current source, but instead includes known resistance load 52. Load 52 is coupled to controller 30, and is selectively shunts the thermocouple circuit in response to a control signal received from controller 30. A schematic illustration of load 52 in the thermocouple circuit is shown in FIG. 6. In embodiments where measurement circuitry 26 is suitably accurate, and has an appropriate input impedance, use of load 52 can provide diagnostics without necessarily passing the a diagnostic current through the thermocouple. Since load 52 is of known resistance, the effect of load 52 shunting the thermocouple circuit is used to provide an indication of thermocouple resistance.

Figure 7:
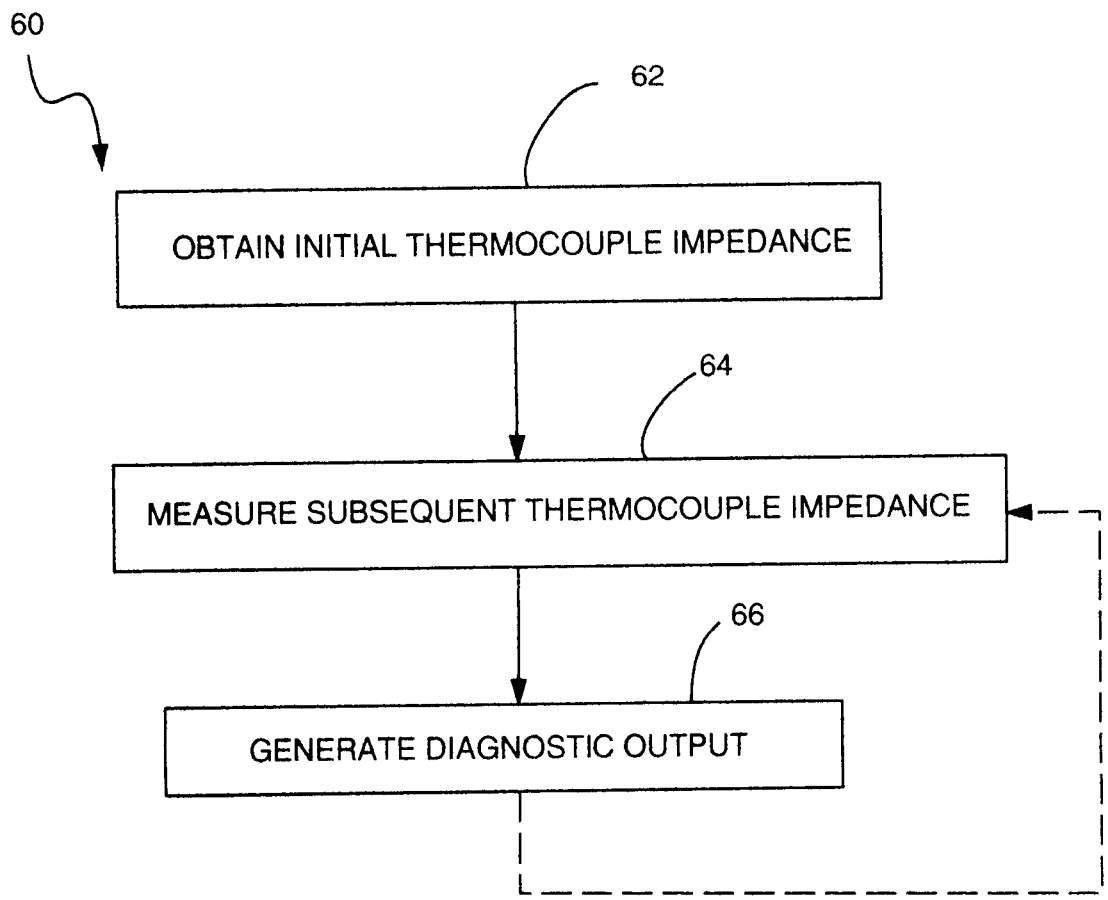
FIG. 7 is a block diagram of a method of measuring thermocouple degradation with a two-wire temperature transmitter.

FIG. 7 is a system block diagram of a method 60 of measuring thermocouple degradation in a two-wire temperature transmitter. The method begins at block 62 where the two-wire transmitter obtains an initial resistance of a thermocouple, such as thermocouple 32. Transmitter 60 can obtain the initial resistance in various ways. For example, the initial resistance can be measured by the transmitter during commissioning. Alternatively, the initial resistance value can be sent to the transmitter through the two-wire process control loop, after the resistance is measured elsewhere (such as at the thermocouple manufacturer).

At block 64, a subsequent thermocouple resistance is measured. Such measurement is effected in the manner described above. Optionally, effects of the Seebeck voltage can be removed or reduced from the subsequent resistance measurement to enhance accuracy. Such compensation can be done by reversing the direction that diagnostic current passes through the thermocouple and measuring the average absolute value of the resultant voltage for each current direction. The compensation can also be done by simply subtracting the Seebeck voltage from the voltage measured while the diagnostic current passed through the thermocouple. Additionally, the compensation can also be done by ensuring that the diagnostic current creates a voltage drop across the thermocouple that is significantly larger that the Seebeck voltage, thus reducing the effect of the Seebeck voltage. For example, diagnostic current as high as one millamp or more can be used.

At block 66, a diagnostic output is generated that is related to a comparison between the initial thermocouple resistance and the subsequent resistance. The diagnostic output can be in any of the various forms given above. After the diagnostic output has been generated it can optionally be transmitted across a two-wire process control loop. Block 66 can optionally pass control to block 64 such that multiple iterations are provided. The iterations can occur after a pre-selected delay, such as every ½ hour. The delay can also be random, or it can be a function of the last known thermocouple degradation value. Thus, as the thermocouple degrades, diagnostic method 32 can be invoked more frequently. Additionally, method 62 can also be invoked by a suitable command received by the transmitter (either locally, or through process control loop 16) to enter the diagnostic mode.

Although the invention has been described with reference to specific modules and functional blocks, such description is for clarity. It is contemplated that any or all of the various blocks can be combined, such as in an Application Specific Integrated Circuit (ASIC).

What is claimed is:

1. A two-wire process fluid temperature transmitter comprising:

a power module couplable to a two-wire process control loop to solely power the transmitter with power received from the two-wire process control loop;

a loop communicator coupled to the power module and couplable to the two-wire process control loop, the loop communicator configured to communicate over the two-wire process control loop;

a thermocouple input couplable to a thermocouple to receive a thermocouple signal;

measurement circuitry coupled to the power module and the thermocouple input, the measurement circuitry adapted to measure voltage across the thermocouple input;

a current source coupled to the power module and the thermocouple input, the current source adapted to selectively pass a diagnostic current through the thermocouple input in a diagnostic state, and pass substantially no current through the thermocouple input in a normal state;

a controller coupled to the power module, the loop communicator, the measurement circuitry, and the current source, the controller adapted to receive a measurement signal from the measurement circuitry during the normal state, and a diagnostic signal from the measurement circuitry during the diagnostic state, the diagnostic signal related to resistance across the thermocouple input, the controller adapted to provide an output to the loop communicator related to at least one of the diagnostic signal and measurement signal;

wherein the current source is adapted to pass the diagnostic current in alternate directions during the diagnostic state; and the diagnostic signal relates to voltages resulting from the diagnostic current flow in the opposite directions.

2. The transmitter of claim 1, wherein the output is a combination of the diagnostic signal and the measurement signal.

3. The transmitter of claim 2, wherein the measurement and diagnostic signals are combined to provide a compensated output.

4. The transmitter of claim 1, wherein the diagnostic current is at least one microamp.

5. The transmitter of claim 1, wherein the diagnostic signal is an estimate of a remaining period of acceptable thermocouple use.

6. The transmitter of claim 1, and further comprising a memory circuit coupled to the controller and adapted to periodically store data indicative of the diagnostic signal.

7. The transmitter of claim 6, wherein the memory circuit is adapted to store data indicative of a plurality of diagnostic signals over time.

8. The transmitter of claim 1, wherein the diagnostic signal is a user-notification indicative of thermocouple resistance in excess of a pre-selected threshold.

9. The transmitter of claim 1, wherein the process control loop is a 4–20 mA process control loop.

10. The transmitter of claim 1, wherein the loop communicator is adapted to digitally transmit the diagnostic signal.

11. The transmitter of claim 1, wherein the current source is a semiconductor current source.

12. A method of measuring thermocouple degradation with a two-wire temperature transmitter, the method comprising:

obtaining an initial thermocouple resistance;

measuring a subsequent thermocouple resistance with the temperature transmitter;

generating a diagnostic output related to a comparison between the initial thermocouple resistance and the subsequent thermocouple resistance; and wherein measuring the subsequent resistance comprises passing a known current through the thermocouple in a first direction while measuring a first resulting voltage, and passing the known current through the thermocouple in a direction opposite the first direction while measuring a second resulting voltage; and the diagnostic output is related to an average of the absolute values of the first and second voltages.

13. The method of claim 12, wherein measuring the subsequent thermocouple resistance and generating the diagnostic output are repeated at an interval based upon the diagnostic output.

14. The method of claim 12, wherein obtaining the initial thermocouple resistance comprises measuring the initial thermocouple resistance with the temperature transmitter.

* * * * *

UNITED STATES PATENT AND TRADEMARK OFFICE
CERTIFICATE OF CORRECTION

PATENT NO.    : 6,556,145 B1                                           Page 1 of 1
DATED         : April 29, 2003
INVENTOR(S)   : Kirkpartick et al.

It is certified that error appears in the above-identified patent and that said Letters Patent is hereby corrected as shown below:

<u>Title page,</u>
Item [56], References Cited, OTHER PUBLICATIONS, please add the following reference:
-- "Transmission Control Protocol: Darpa Internet Program Protocol Specification" Information Sciences Institute, September 1981, pp. 1-78. --

Please delete the following references (first occurrence):
"On-Line Tool Condition Monitoring Systen With Wavelet Fuzzy Neural Network," by Li Xiaoli et al., pp. 271-276 (1997)." and "U.S. Patent Application Seri. No. 09/852,102, Eryurek et al., filed May 9, 2001."

Signed and Sealed this

Twenty-sixth Day of August, 2003

JAMES E. ROGAN
*Director of the United States Patent and Trademark Office*